(12) United States Patent
Yang (10) Patent No.: US 7,317,753 B2
(45) Date of Patent: Jan. 8, 2008

(54) DYNAMIC MATCHED FILTER BANK AND ITS APPLICATION IN MULTI-CHANNEL SPREAD SPECTRUM COMMUNICATION SYSTEMS

(76) Inventor: George L. Yang, 15 Longfellow Ct., Freehold, NJ (US) 07728

( * ) Notice: Subject to any disclaimer, the term of this patent is extended or adjusted under 35 U.S.C. 154(b) by 861 days.

(21) Appl. No.: 10/193,599

(22) Filed: Jul. 11, 2002

(65) Prior Publication Data

US 2004/0008759 A1    Jan. 15, 2004

(51) Int. Cl.
*H04B 1/00* (2006.01)
(52) U.S. Cl. .................. 375/152; 375/142; 375/143; 375/150; 375/343
(58) Field of Classification Search ............... 375/152, 375/150, 142, 143, 343
See application file for complete search history.

(56) References Cited

U.S. PATENT DOCUMENTS

| | | | | |
|---|---|---|---|---|
| 5,920,287 A | * | 7/1999 | Belcher et al. | 342/450 |
| 6,141,374 A | * | 10/2000 | Burns | 375/152 |
| 6,154,487 A | * | 11/2000 | Murai et al. | 375/150 |
| 6,560,212 B1 | * | 5/2003 | Prasad et al. | 370/335 |

* cited by examiner

*Primary Examiner*—Ted Wang (57) ABSTRACT

A dynamic matched filter bank consists of a plurality of matched filters with either the reference signal for each matched filter changes with the time or the input signal to a matched filter is the received signal modified by a different way for a different matched filter. A receiver employed a set of dynamic matched filter banks in a multi-channel spread spectrum communication system consists of a signal register, a block PN generator, a plurality of spreading sequence generators, a plurality of register arrays, a plurality of multiplier arrays, a plurality of matched filters, a plurality of signal combiners, and a controller. The block PN generator generates a section of PN sequence at the end of every symbol period with feedback logic to shift a block of chips each time. A register array captures each section of PN sequence from the block PN generator and delays it for a symbol period. The rest register arrays are in cascade and delay the section of sequence at each of their inputs by one symbol period. The signal register generates a moving section of the received signal. Each of the multiplier arrays multiplies each moving section of the received signal by a section of PN sequence from either the block PN generator or one of the register arrays to provide a input signal to a corresponding matched filter. Each of the matched filter is to find the correlation between the section of its input signal and the section of its reference signal, which is a spreading sequence from a corresponding spreading sequence generator. Each of the signal combiners will combine the components from corresponding matched filters. The controller will monitor the signals from all matched filters and all signal combiners, extract necessary information, and generate various control signals.

20 Claims, 9 Drawing Sheets

--PRIOR ART--

DYNAMIC MATCHED FILTER BANK AND ITS APPLICATION IN MULTI-CHANNEL SPREAD SPECTRUM COMMUNICATION SYSTEMS

FEDERALLY SPONSORED RESEARCH

Not Applicable

SEQUENCE LISTING OR PROGRAM

Not Applicable

FIELD OF THE INVENTION

The invention is generally related to a bank of matched filters employed in a communication circuit. More particularly the invention is related to a bank of matched filters for detecting, tracking, and combining the components of a multipath signal spanned over several symbol periods in a radio link of a multi-channel direct sequence spreading spectrum communication system.

BACKGROUND OF THE INVENTION

In a wireless communication system, especially in a mobile communication system, fading occurs from times to times. Buildings, mountains, and foliage on the transmission path between a transmitter and a receiver can cause reflection, diffraction, and scattering on a propagating electromagnetic wave. The electromagnetic waves reflected from various large objects, travel along different paths of varying lengths. If there is an obstacle with sharp irregularities on the transmission path, the secondary waves resulting from the obstructing surface are present around the obstacle. Also if there are small objects, rough surfaces, and other irregularities on the transmission path, scattered waves are created. All these waves will interact with each other and cause multipath fading at specific locations.

The multipath fading can seriously deteriorate the quality of a communication system. In a multi-channel communication system, the multipath fading could be more serious. Each component of a multipath fading signal on a particular channel only not interferes with the other components of the signal, but also interferes with each component of the signals on other channels.

Direct sequence spread spectrum system is multipath resistant due to the fact that the delayed versions of the transmitted pseudo-noise (PN) signal have poor correlation with the original PN signal. Together with a RAKE receiver, a direct sequence spread spectrum system can combine the information obtained from several resolvable multipath components and therefore improve the system performance.

In a RAKE receiver, usually there are a searcher, several fingers, and a signal combiner. A searcher is a device to detect each major component of a multipath signal and obtain the information about the component, such as signal strength, phase, and time relation. A finger is a device to track a particular component of a multipath signal. A signal combiner is a device to combine the various components of a multipath signal together.

One can build a searcher based on either correlator or matched filter. A searcher based on correlator shifts its local reference signal by an amount of time and then compares the input signal with the shifted local reference signal for a period of time. It finds the multipath information by repeating the process of shifting and comparing. Usually, the smaller the amount of time shifted, the higher the time resolution on a multipath signal; the longer the period of time compared, the more reliable the detection result. A searcher based on matched filter compares a fixed section of reference signal with a section of input signal while the input signal keeps coming. The lengths of both sections are equal. It can detect a component of a multipath signal immediately when the component is coming. Generally speaking, to have about the same confidence on detection result, a searcher based on correlator needs less hardware but more time, while a searcher based on matched filter needs less time but more hardware.

In a packet-switched communication system, the packet received could come from total different source than the previous one and generally there is no any relation between two adjacent packets. In order to obtain multipath information quickly, one may desire to use matched filter especially when transmission rate is very high. Also even there are some similarities between a searcher and a finger, in many communication systems, searchers and fingers are built separately, which results in more hardware. In order to save hardware, one may desire to use the same set of matched filters to serve both searcher and fingers.

Figure 1:
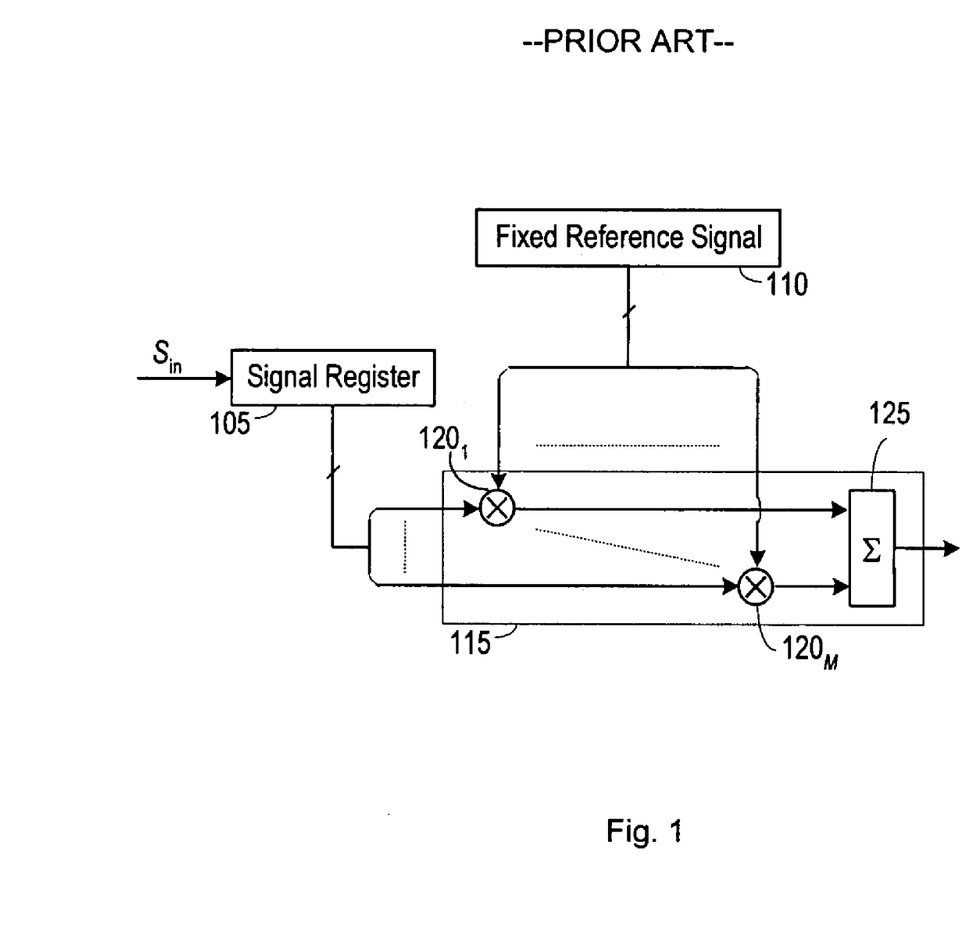
FIG. 1 illustrates a portion of a searcher subsystem based on regular matched filter.

A portion of a searcher based on regular matched filter is shown in FIG. 1.

The signal register 105 consists of a plurality of registers with the first register connected to input signal $S_{in}$, and each of the rest registers connected to its previous one. Usually these registers are driven by a same clock such as the sampling clock of input signal $S_{in}$. There is a tapped output after every several registers and together there are M tapped outputs. The signals at the M outputs are replicas of the input signal $S_{in}$ with different delays. The delay between any two adjacent output signals is the same.

In a digital implementation of a matched filter, it is necessary to align up the input signal and the reference signal in time domain in order to make the matched filter to work. That is, there must be a same number of samples from the input signal and from the reference signal for comparison at any moment and the sampling periods for both the input signal and the reference signal must be the same.

The fixed reference signal 110 also has M output signals invariant with the time. They are a sampled version of a local reference signal in a predetermined time interval with delay between any two adjacent samples being equal to the delay between two adjacent output signals of signal register 105. When the local reference signal is a PN sequence, the fixed reference signal is a section of the PN sequence. Usually the section is a whole sequence of a short PN sequence are section of a long PIN sequence. In the latter case, since the M outout signals of the fixed reference signal 110 are invariant with the time to provide a fixed reference in a regular matched filter, the section is a fixed section and does not change with the time. Having a fixed reference signal, a regular matched filter does not change its reference section and therefore it usually is used for detecting if a signal is matched to a whole sequence of a short sequence or if a signal is matched to a particular fixed section of a long sequence.

A section of input signal $S_{in}$ is represented by M output signals from the signal register 105 and a section of the local reference signal is represented by M output signals from the fixed signal 110. Since the M outout signals of the fixed reference signal 110 are invariant with the time, the section of the local reference signal used for detection is a fixed section of the local reference signal or a whole sequence of the local reference signal. In other words, the reference section does not change with the time.

The matched filter 115 consists of a plurality of multipliers and an adder. Each of the multipliers $120_1$ to $120_M$ will multiply an output signal from fixed reference signal 110 with a corresponding output signal from signal register 105. The adder 125 will add the products from all of the multipliers together. Matched filter 115 takes the summation as its output, which is the correlation between the section of input signal $S_{in}$ and the section of the reference signal.

Since FIG. 1 is part of a searcher, it is desirable that either the M signals from local fixed reference signal 110 correspond to a unique word specially for finding various components of a multipath signal or M is very large so that there is no confusion to identify a multipath component. To save hardware, one may want to use the same hardware to serve a finger. As FIG. 1 has to be part of a finger, the M output signals from local fixed reference signal 110 can not be the same unique word required by searcher, otherwise the word is not unique. Also, the M output signals should correspond to one symbol period otherwise it is difficult to separate the contribution of the first data symbol from the contribution of the second data symbol. However, when the M output signals from local fixed reference signal 110 correspond to one symbol period and do not correspond to a unique word, the searcher based FIG. 1 can not detect a multipath signal spanned over several symbol periods. Because there is no way to tell that if a detected component is a component of first symbol or a component of second symbol.

To detect and track a multipath signal spanned over more than 1 symbol period correctly based on a same set of matched filters, it is necessary for the reference signal to be different in several adjacent symbol periods. In regular matched filter, the reference signal is fixed as shown in FIG. 1. Therefore when the reference signal varies from symbol period to symbol period, the structure based FIG. 1 does not apply. To distinguish from regular matched filter, one can refer a matched filter with a variable reference signal or with a modified input signal as a dynamic matched filter.

It would, therefore, be desirable to build dynamic matched filters in a receiver for detecting, tracking, and combining the various components of a multipath signal spanned over several symbol periods.

OBJECTIVES OF THE INVENTION

The primary objective of the invention is to detect, track, and combine the various components of a multipath signal based on a same set of dynamic matched filters.

Another objective of the invention is to construct a receiver based on a set of dynamic matched filters with the capability to detect, track, and combine the various components of a multipath signal scatted over several symbol periods on each channel of a multi-channel communication system.

Another objective of the invention is to reduce the total hardware needed for building individual searcher and finger by jointly designing a set of dynamic matched filters in a receiver of a multi-channel spread spectrum communication system.

BRIEF DESCRIPTION OF THE DRAWINGS

The accompanying drawings, which are incorporated in and constitute a part of the specification, depict the preferred embodiments of the present invention, and together with the description, serve to explain the principle of the invention. In the figures, like reference numerals refer to the same or similar elements.

DETAILED DESCRIPTION OF THE PREFERRED EMBODIMENTS

Detailed description of the preferred embodiments is provided herein. The embodiments illustrate dynamic matched filter bank and its applications in communication systems by way of examples, not by way of limitations. It is to be understood that it could be easy for those skilled in the art to modify the embodiments in many different ways.

For example, instead of first mapping a binary bit into +1 or −1 value, then multiplying a signal by value +1 or −1 correspondingly, one can let the signal pass when the binary bit is 0 and let the negative of the signal pass when the binary bit is 1.

Here is another example. Instead of multiplying or exclusive-or each chip of a binary PN sequence by the corresponding chip of a binary spreading sequence, one can design linear feedback shift register with such a feedback logic that the generated sequence is the exclusive-or of the PN sequence and the spreading sequence.

Figure 8:
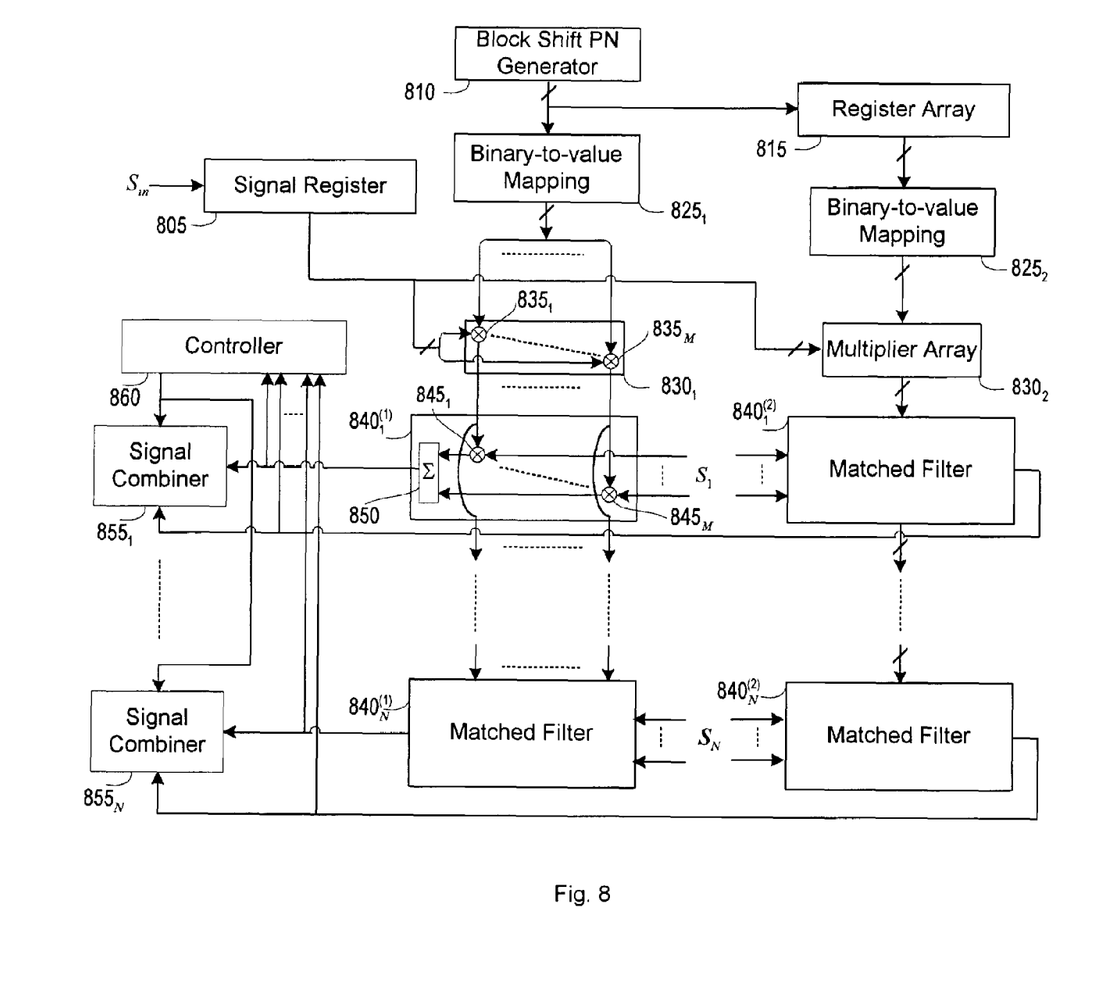
FIG. 8 illustrates the essential of a receiver with a set of dynamic matched filter banks in a multi-channel direct sequence spread spectrum communication system with a reference signal consisting of the spreading signals and the scrambled signal as in FIG. 6.

More complex example could be given. In FIG. 8, first a section of a modified input signal is obtained by multiplying a section of received signal with a section of a scrambled signal. Then a matched filter is used to find the correlation between the section of the modified input signal and a section of a spreading signal. Instead, one can obtain a section of a modified input signal by multiply a section of received signal with a section of a spreading signal, and then let a matched filter to find the correlation between the section of the modified input signal and a section of a scrambled signal.

Therefore, specific details disclosed are not to be interpreted as limitations, but rather as bases for the claims and as representative bases for teaching one to employ the present invention in virtually any appropriately detailed system, structure or manner.

Figure 2:
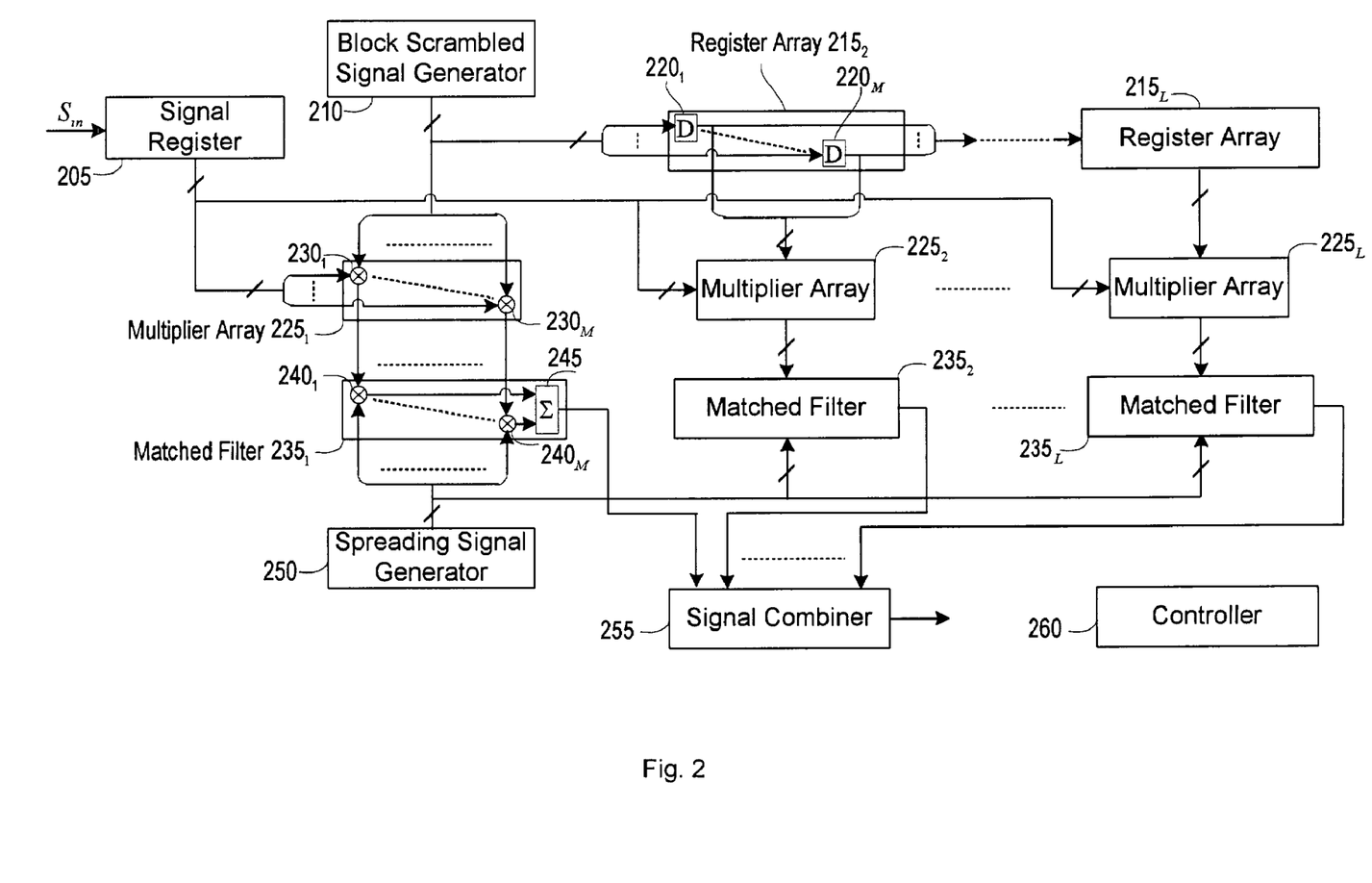
FIG. 2 illustrates the first embodiment of a dynamic matched filter bank in a direct sequence spread spectrum communication system with the reference signal consisting of a spreading signal and a scrambled signal.

FIG. 2 shows the first embodiment of a dynamic matched filter bank in a direct sequence spread spectrum communication system with the reference signal consisting of a spreading signal and a scrambled signal.

There are several assumptions. First, the local reference signal consists of a spreading signal and a scrambled signal. Second, the multipath fading spans over less than L symbol periods. Third, the M output signals from either signal register or block scrambled signal generator correspond to a symbol period. Fourth, the spreading signal has only one section, which corresponds to a symbol period and does not change with the time. Fifth, the section of a scrambled signal in any symbol period is different from the section in any other adjacent L symbol periods.

The reference signal is a combination of a scrambled signal and a spreading signal. In FIG. 2, a plurality of modified input signals are obtained by modifying the input signal with the scrambled signal with different delays. And a bank of matched filters are used to obtain the correlation values between each of the modified input signals and the spreading signal.

The signal register 205 has M tapped output signals. These M tapped output signals could be simply plural copies of the input signal $S_{in}$ with the delay between any two adjacent copies being the same. In some cases, the M tapped output signals could be a moving section of sampled version or an interpolated version of the input signal.

The block scrambled signal generator 210 generates M output signals. These M signals are a sampled version of a scrambled signal in a symbol period. For the scrambled signal changes with the time, these M signals also change from one symbol period to another but are constant during any symbol period. When the scrambled signal is a PN sequence, a block scrambled signal generator is a block PN generator and a block of scrambled signal is a window of M chips of a PN sequence with the window moving M chips at the end of every M chip clocks or one symbol period. One can build a linear feedback shift register as the block scrambled signal generator 210 with the feedback logic to shift M chips at the end of every M chip clocks. Of course, when the PN generator has less than M stages, extra registers should be appended so that there are M signals out of the block scrambled signal generator 210.

The M signals from block scrambled signal generator 210, are connected to a multiplier array 225$_1$ and a register array 215$_2$. Each register array consists of M memory elements 220$_1$ to 220$_M$ driven by a symbol clock. The register array 215$_2$ is connected to another multiplier array 225$_2$ and cascaded by another register array 215$_3$ (not shown in the figure). There are total L−1 register arrays 215$_2$ to 215$_L$ in cascade.

Each M signals from the block scrambled signal generator 210 and the L−1 register arrays 215$_2$ to 215$_L$ are sent to one of multiplier arrays 225$_1$ to 225$_L$ respectively. In each of the multiplier arrays, there are M multipliers 230$_1$ to 230$_M$. Each multiplier multiplies a tapped output signal from signal register 205 with a corresponding signal from the block scrambled signal generator 210 or from one of the register arrays 215$_2$ to 215$_L$. When the scramble signal is a binary sequence, one can use a selective device instead of a multiplier. For example, if binary 0 lets a tapped output signal from signal register pass, then binary 1 will let the negative of the tapped output signal pass.

The spreading signal 250 also has M output signals. These M signals correspond to a symbol period and do not change with the time.

The M outputs from each of the L multiplier arrays are sent to one of the L matched filters 235$_1$ to 235$_L$. In each matched filter, there are M multipliers and an adder. Each of these multipliers 240$_1$ to 240$_M$ multiplies the product from a corresponding multiplier in a multiplier array with a corresponding signal from the spreading signal generator 250. When the spreading signal is binary sequence, one can use a selective device instead of a multiplier with binary 0 to select a product itself and binary 1 to select the negative of the product.

The adder 245 in each matched filter will add all the products from the M multipliers in each matched filter together. Each matched filter takes a corresponding summation as its output. The outputs from all these matched filters will be sent to signal combiner 255.

For a signal consisting of the combination of a spreading signal and a section of a local scrambled signal, the first matched filter 235$_1$ will detect all of the multipath components of a signal falling into the first symbol period. The second matched filter 235$_2$ will detect all of the multipath components of the signal falling into the second symbol period. The No. L matched filter 235$_L$ will detect all of the multipath components of the signal falling into the No. L symbol period. The L matched filters 235$_1$ to 235$_L$ comprise a matched filter bank.

The outputs from all matched filters 235$_1$ to 235$_L$ and signal combiner 255 will be sent to controller 260. The controller 260 will monitor the signals from each matched filter. It will examine not only various multipath components, but also couple of sampled points before and after each of these multipath components. It will extract information and generate various control signals. These control signals could include the ones to adjust the position of a multipath component and replace a weak component with a stronger component. The signal combiner 255 will combine all the significant components together.

Figure 3:
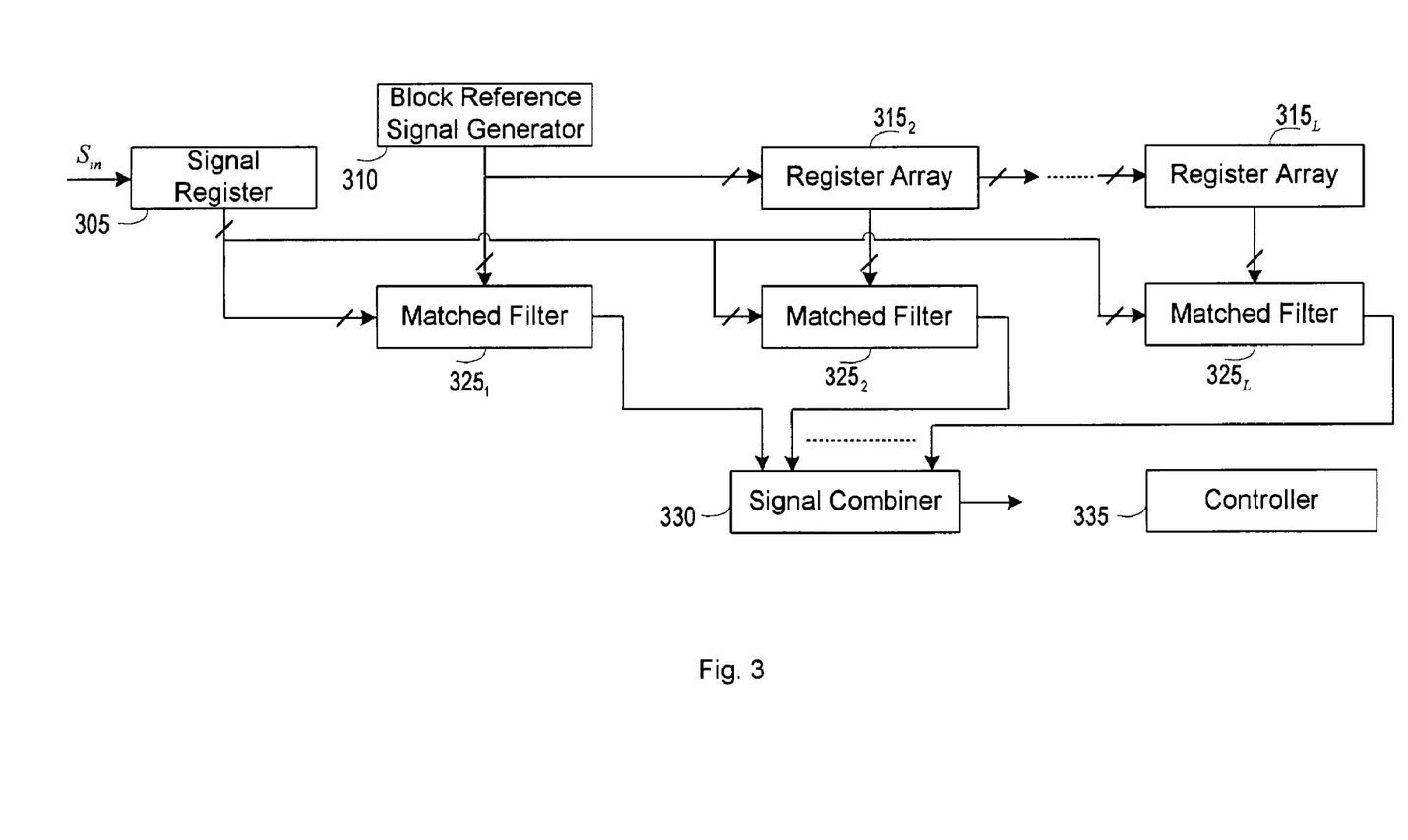
FIG. 3 illustrates the second embodiment of a dynamic matched filter bank in a communication system.

FIG. 3 shows the second embodiment of a dynamic matched filter bank in a communication system.

Here are some assumptions. First, the multipath fading spans over less than L symbol periods. Second, the M output signals from signal register or from block reference signal generator correspond to a symbol period. Third, the section of a reference signal in any symbol period is different from the section in any other adjacent L symbol periods.

Being same as the signal register in FIG. 1, signal register 305 has M tapped output signals with each one is a replica of the input signal $S_{in}$ with different delay.

There are M output signals from the block reference signal generator 310. These M signals are a sampled version of a local reference signal in a symbol period. Since the reference signal changes with the time, these M signals also change from one symbol period to another but are constant during a symbol period. When the reference signal is a PN sequence, the block reference signal is a window of M chips of the PN sequence with the window moving M chips at the end of every M chip clocks or one symbol period.

The M signals from the block reference signal generator 310 are sent to a register array 315$_2$ and a matched filter 325$_1$. There are L−1 register arrays 315$_2$ to 315$_L$ in cascade and L matched filters 325$_1$ to 325$_L$. These L matched filters 325$_1$ to 325$_L$ comprise a matched filter bank.

Like a register array in FIG. 2, each register array has M memory elements. Each of these memory elements will delay its input signal by exact one symbol period.

Each matched filter also has M multipliers and an adder. These multipliers will multiply each of the M signals from either the block reference signal generator 310 or one of the L−1 register arrays $315_2$ to $315_L$ with a corresponding signal from signal register 305. The adder will then sum all the products together and a corresponding matched filter will take the summation as its output.

For a signal consisting of a section of current reference signal, the first matched filter $325_1$ will detect all of the multipath components of the signal falling into the first symbol period. The second matched filter $325_2$ will detect all of the multipath components of the signal falling into the second symbol period. The No. L matched filter $325_L$ will detect all of the multipath components of the signal falling into the No. L symbol period.

The controller 335 will monitor the signals from each matched filter as well as from signal combiner 330, extract information, and generate various control signals. Under the control of controller 260, the signal combiner 330 will combine all the significant components from matched filters $325_1$ to $325_L$ together.

Instead of using L-1 registers arrays $315_2$ to $315_L$, one skilled in the art can use L-1 combination logic circuits with each combination logic circuit transferring the current state or current section of the block reference signal generator 310 into a different state or a different section separating from the current state or current section by a predefined number of chips. The block reference signal generator 310 generates a state, holds the state for one symbol period, and then produces a new state separating from the old state by number of chips in a symbol period. Usually a section could be a state but depending on requirement, a section could have more or less chips than a state. For example, in a linear feedback shift register with 15 stages, a state can be expressed with 15 bits. If in a particular application, a symbol has 30 chips instead of 15 chips, then a section will correspond to 30 chips. One skilled in the art can also design other L-1 block reference signal generators with any two of them having a difference of a multiple of M phase offsets. One skilled in the art can further use just a block reference signal generator and L register arrays. The block reference signal generator produces the states for different register arrays by turn with the adjacent states differed by a symbol period. Each register array has N registers and N tapped outputs. The registers of each register array take corresponding tapped output from the block reference signal generator as its input and update every symbol period.

Figure 4:
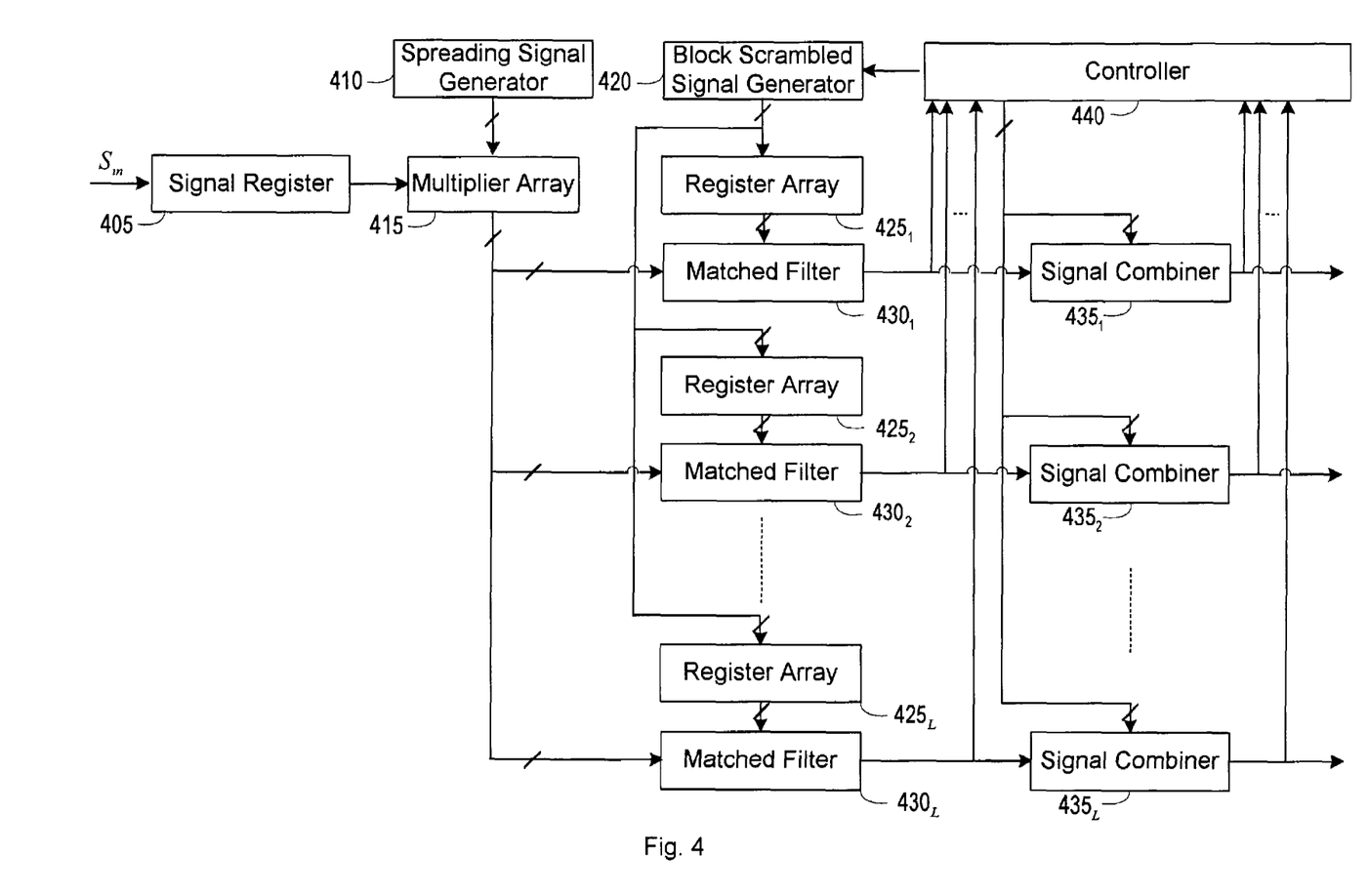
FIG. 4 illustrates the third embodiment of a dynamic matched filter bank in a direct sequence spread spectrum communication system with the reference signal consisting of a spreading signal and a scrambled signal.

FIG. 4 shows the third embodiment of a dynamic matched filter bank in a direct sequence spread spectrum communication system with the reference signal consisting of a spreading signal and a scrambled signal.

The assumptions are same as those with FIG. 2.

The reference signal is a combination of a scrambled signal and a spreading signal. In FIG. 4, a modified input signals is obtained by modifying the input signal with the spreading signal. And a bank of matched filters is used to obtain the correlation values between the modified input signal and each of the scrambled signals with different delays.

The signal register 405 has M tapped output signals with each one is a replica of the input signal $S_{in}$ with different delay. The spreading signal generator 410 also has M output signals, which correspond to a symbol period and are a sampled version of the spreading signal. The M output signals from spreading signal generator 410 do not change with the time.

There is a multiplier array 415 with M multipliers. Each multiplier multiplies a signal from signal register 405 with a corresponding signal from spreading signal generator 410. The matched filter $430_1$ to $430_L$ will take the M products as their input signal.

The block scrambled signal generator 410 generates M output signals. These M signals are a sampled version of the local scrambled signal in a section corresponding to a symbol period. They do not change with in any symbol period but may be change from one symbol period to another. The M signals will be sent to register arrays $425_1$ to $425_L$.

There are M memory elements in each of the register arrays $425_1$ to $425_L$. Each register array will capture the M output signals from the block scrambled signal generator 420 and hold them for L symbol periods, then recapture another the M output signals and hold for another L symbol periods, and so on. Different register array will capture M output signals at different symbol period. The M outputs of a register array will be sent to a corresponding matched filter as its reference signal.

There are L matched filters $430_1$ to $430_L$, which comprise a matched filter bank. In a matched filter, there are M multipliers and an adder. Each component of the modified input signal from multiplier register 415 will be multiplied by a corresponding component of its reference signal. The matched filter will take the summation as its output signal.

A first section of a transmitted signal, corresponding to one symbol, will span over less than L symbol periods during transmission. The first matched filter $430_1$ will detect all the scattered versions of the first section stretched over less than L symbol periods. After all these L symbol periods have passed, the first matched filter $430_1$ will be assigned to detect a new symbol. A second section of the transmitted signal, corresponding to another symbol and immediately after the first section, will also span over less than L symbol periods during transmission. The second matched filter $430_2$ will detect all the scattered versions of the second section stretched over less than L symbol periods. The scattered versions of the first section and second section will overlap L−1 symbol periods. Other matched filters work in the same way.

The controller 440 will monitor the signals from each matched filter as well as from each signal combiner, extract information, and generate various control signals. These control signals could include the ones to adjust the position of a multipath component and replace a weak component with a stronger component.

There are L signal combiners $435_1$ to $435_L$. Under the control of controller 440, each signal combiner will combine all of the significant components of a multipath signal spanned over less than L symbol periods from a corresponding matched filter.

Figure 5:
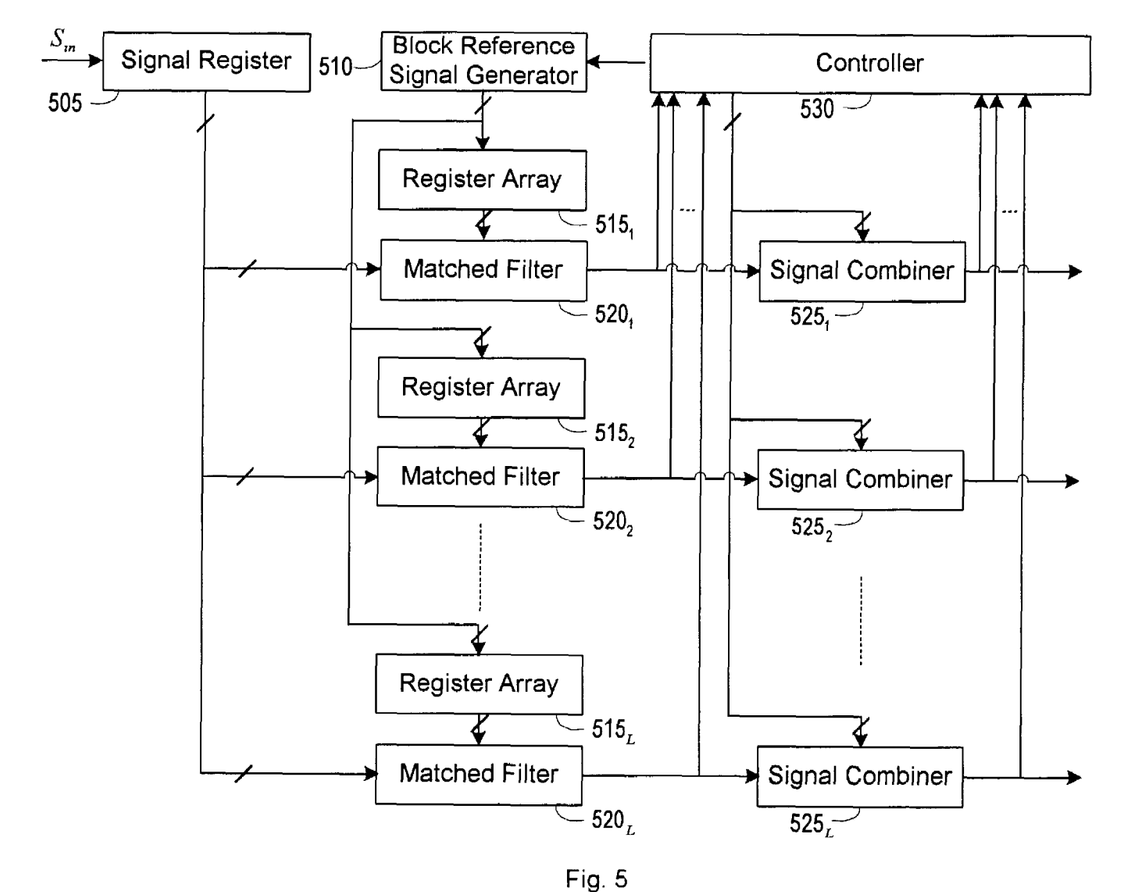
FIG. 5 illustrates the fourth embodiment of a dynamic matched filter bank in a communication system.

FIG. 5 shows the fourth embodiment of a dynamic matched filter bank in a communication system.

The assumptions are same as those with FIG. 3.

Signal register 505 has M tapped output signals with each one is a replica of the input signal $S_{in}$ with different delay.

There are M output signals from the block reference signal generator 510. These M signals correspond to a symbol period and are a sampled version of the local reference signal. They do not change during any symbol period but could change from one symbol period to another. They are fed to a set of register arrays $515_1$ to $515_L$.

There are M memory elements in each of the register arrays $515_1$ to $515_L$. Each register array will capture the M output signals from the block reference signal generator 510 and hold for L symbol periods, then recapture another the M output signals and hold for another L symbol periods, and so on. Different register array will capture M output signals at different symbol period.

There are L matched filters $520_1$ to $520_L$, which comprise a matched filter bank. As before, in a matched filter, there are M multipliers and an adder. Each of the M signals from one of the L register arrays is multiplied by the corresponding signal from signal register 505 and all the products will be added up. A matched filter will take a corresponding summation as its output signal.

A first section of a transmitted signal, corresponding to one symbol, will span over less than L symbol periods during transmission. The first matched filter $520_1$ will detect all the scattered versions of the first section stretched over less than L symbol periods. After all these L symbol periods have passed, the first matched filter $520_1$ will be assigned to detect a new symbol. A second section of the transmitted signal, corresponding to another symbol and immediately after the first section, will also span over less than L symbol periods during transmission. The second matched filter $520_2$ will detect all the scattered versions of the second section stretched over less than L symbol periods. The scattered versions of the first section and second section will overlap L-1 symbol periods. And so on. A No. L section of the transmitted signal, corresponding to another symbol and immediately after the No. L-1 section, will also span over less than L symbol periods during transmission. The No. L matched filter $520_L$ will detect all the scattered versions of the No. L section stretched over less than L symbol periods. The scattered versions of any two adjacent sections will overlap L-1 symbol periods.

The controller 530 will monitor the signals from each matched filter as well as each signal combiner, extract information, and generate various control signals.

There are L signal combiners $525_1$ to $525_L$. Under the control of controller 530, each signal combiner will combine all of the significant components of a multipath signal spanned over less than L symbol periods from a corresponding matched filter together.

Figure 6:
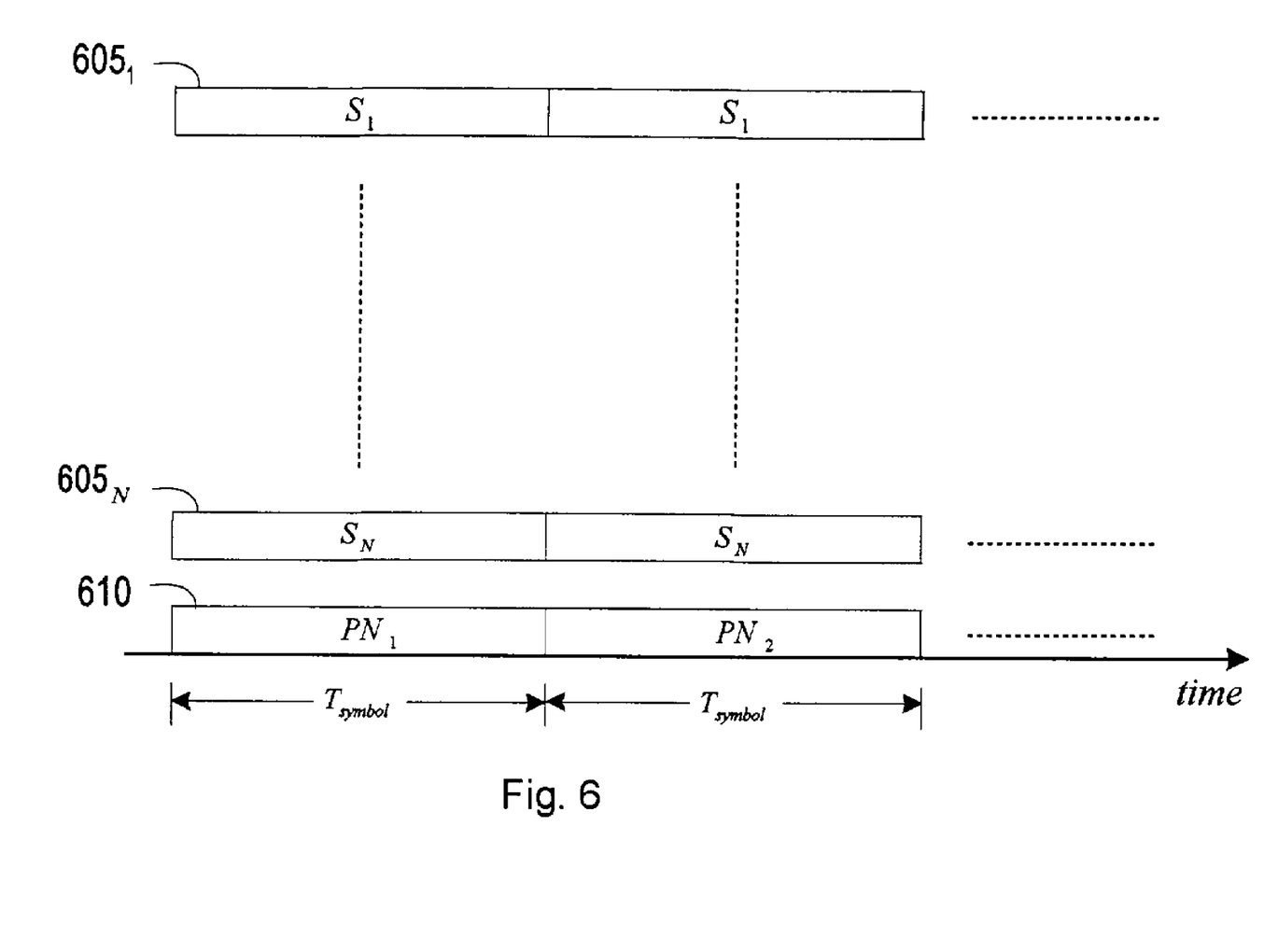
FIG. 6 illustrates spreading signals for each of the multi-channels and a scrambled signal of a multi-channel direct sequence spread spectrum communication system.

FIG. 6 shows spreading signals for each of multi-channels and a scrambled signal of a multi-channel direct sequence spread spectrum communication system.

There are N spreading signals $605_1$ to $605_N$ with one for each of the N channels. These N spreading signals $S_1$ to $S_N$ are different from each other. In many cases, they are orthogonal. Also in many systems, the spreading signals $S_1$ to $S_N$ do not change from one symbol period to another.

There is a scrambled signal or PN signal 610. The section of PN signal in the first symbol period is denoted by $PN_1$, in the second symbol period is denoted by $PN_2$, and etc. In order to distinguish multipath components of a signal, the section of a scramble signal in any of the L symbol periods is different from the section in any other symbol period. Again L is the number that no significant component of a multipath signal will span over more than L symbol periods.

Figure 7:
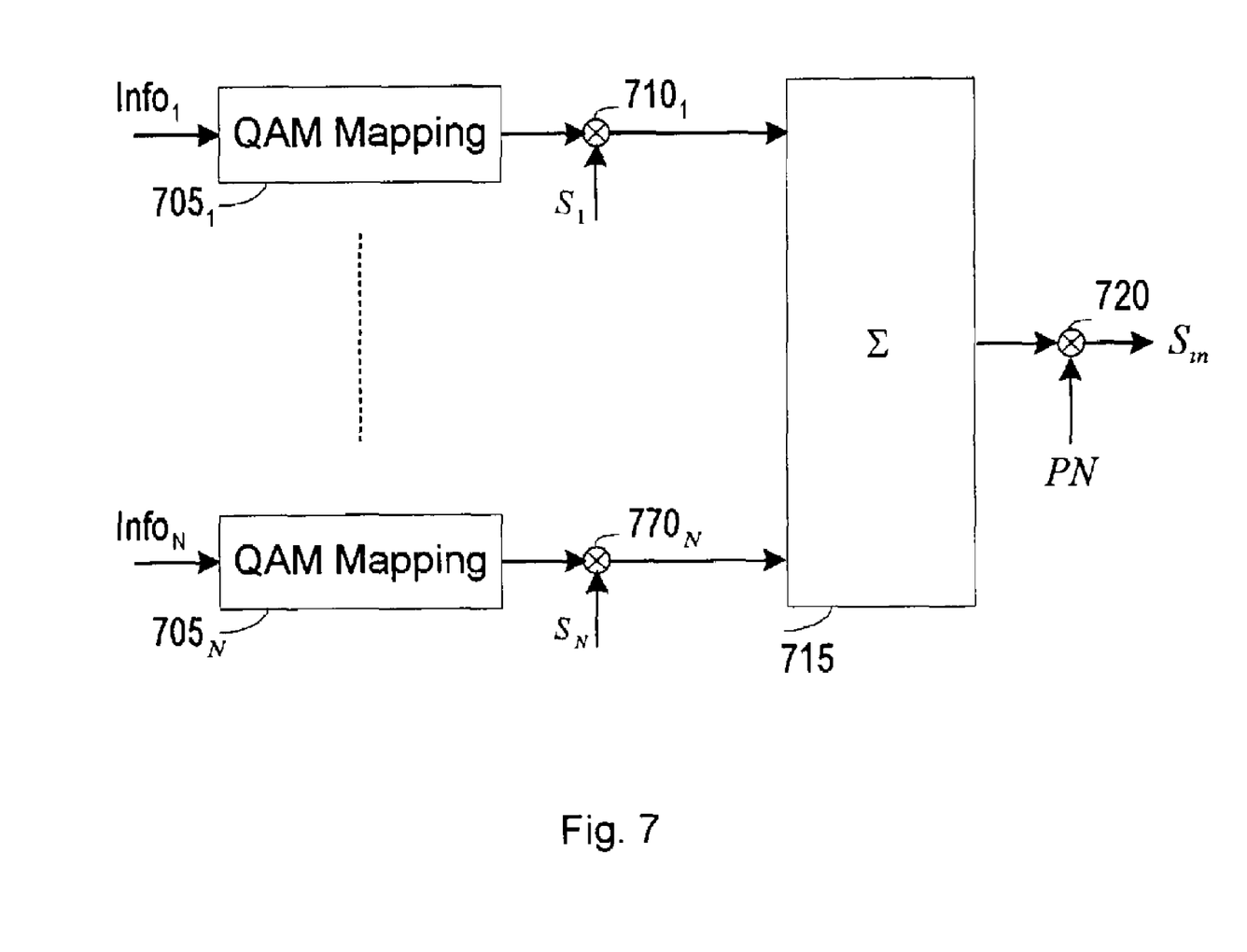
FIG. 7 illustrates the essential of a transmitter in a multi-channel direct sequence spread spectrum communication system with the spreading signals and the scrambled signal as in FIG. 6.

The transmitter structure corresponding to the signals in FIG. 6 is shown in FIG. 7. The information on each channel is first mapped into a QAM signal respectively by one of the QAM mapping devices $705_1$ to $705_N$, and then each of the QAM signals is modulated by one of the spreading signals $S_1$ to $S_N$ at one of the corresponding multipliers $710_1$ to $710_N$. The products from the multipliers $710_1$ to $710_N$ are sent to adder 715. The output signal of adder 715 will be further scrambled by a scrambled signal PN at multiplier 720.

Figure 9:
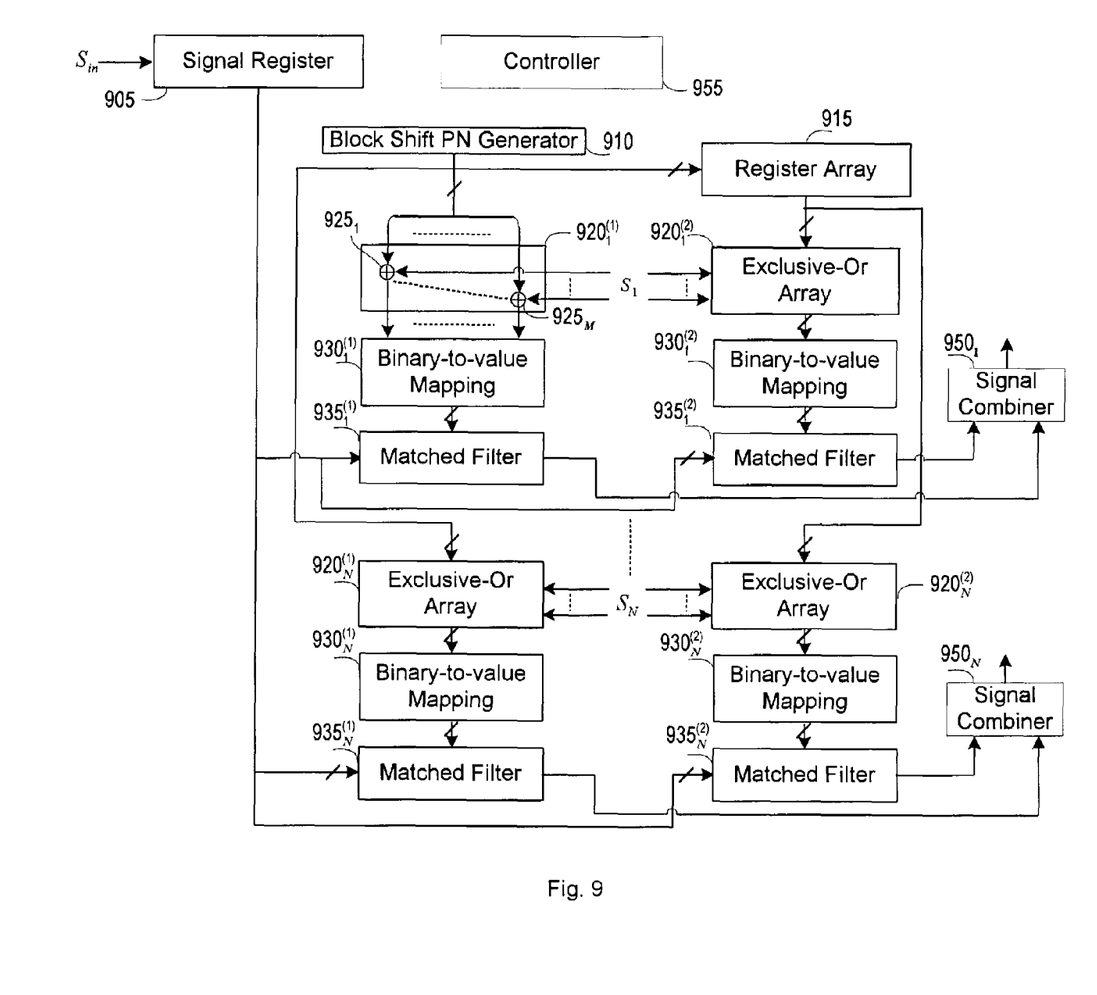
FIG. 9 illustrates the essential of another receiver with a set of dynamic matched filters in a multi-channel direct sequence spread spectrum communication system with a reference signal consisting of the spreading signals and the scrambled signal as in FIG. 6.

In both FIG. 8 and FIG. 9, each reference signal is a combination of two signals. When the reference signal is the combination of two or more signals, each signal is called a component reference signal. Further, when a signal is a sequence of binary bits, one can simply call the signal as a sequence for simplicity.

FIG. 8 shows a receiver with a set of dynamic matched filter banks in a multi-channel direct sequence spread spectrum communication system. The reference signal consists of the spreading signals and the scrambled signal as in FIG. 6 and the dynamic matched filter bank is the similar to the one in FIG. 2.

There are several assumptions. First, the local reference signals are the combinations of a PN sequence and a corresponding spreading signals. Second, the multipath fading spans over less than L symbol periods. Third, the M output signals either from signal register or from block shift PN generator correspond to a symbol period. Fourth, each spreading signal has only one section, which corresponds to a symbol period and does not change with the time. Fifth, a section of the PN sequence is different from any other section in adjacent L symbol periods. Sixth, there are N channels with corresponding spreading signals $S_1$ to $S_N$.

For easy to describe, let L=2.

A group of modified input signals for matched filters are obtained by multiplying the input signal with various copies of the PN signal with different delays.

One can separate the devices into two sets of devices. The first set of devices consists of the block shift PN generator 810, a binary-to-value mapping device $825_1$, a multiplier array $830_1$, and the first matched filter bank consisting of N matched filters $840_1^{(1)}$ to $840_N^{(1)}$. Together with signal combiner and controller, the first set of devices are used to detect, track, and combine all of the components of a multipath signal, which fall into a symbol period called the first symbol interval. The second set of devices consists of a register array 815, a binary-to-value mapping device $825_2$, a multiplier array $830_2$, and the second matched filter bank consisting of N matched filters $840_1^{(2)}$ to $840_N^{(2)}$. Together with signal combiner and controller, the second set of devices are used to detect, track, and combine all of the components of a multipath signal, which fall into the symbol period immediately after first symbol interval.

The input signal, $S_{in}$, is shifted into signal register 805. There are M output signals from signal register 805, with each signal being a replica of input signal $S_{in}$ with different delay.

Now let's say how the first set of devices work.

The block shift PN generator 810 updates its output at the end of every M chips. One can build a block shift PN generator by a linear feedback shift register with feedback logic based on shifting M chips at one time.

The M binary chips from the block shift PN generator 810 are mapped into proper values by binary-to-value mapping device $825_1$ such as mapping binary 0 to value 1.0 and binary 1 to -1.0.

The multiplier array $830_1$ has M multipliers $835_1$ to $835_M$. Each of these M values from mapping device $825_1$ is multiplied by a corresponding signal from signal register 805 at one of the multipliers $835_1$ to $835_M$.

Each matched filter consists of M multipliers and an adder. The M products from a multiplier array $830_1$ will be sent to the matched filter $840_1^{(1)}$. Each of the multipliers $845_1$ to $845_M$ will multiply one of the M signals from multiplier array $830_1$ with a corresponding signal of a spreading signal $S_1$. The adder 850 will add all the products together. The matched filter $840_1^{(1)}$ takes the summation as its output.

The second set of devices has the similar function as the first set. The M output signals from block shift PN generator 810 are also fed to a register array 815. In the register array, there are M memory elements, each of them delays its input by a symbol period, or M chips. The rest devices in second set work in the same way as the corresponding devices in the first set.

There are N signal combiners with one for each channel. Each signal combiner takes two inputs, one from a corresponding matched filter in the first set and another from a corresponding matched filter in the second set. For example, signal combiner $855_1$ takes the outputs from matched filters $840_1^{(1)}$ and $840_1^{(2)}$ to carry out signal combining.

The controller 860 will take the outputs from all matched filters and from all signal combiners to find the information about the components of a multipath signal and generate various control signals.

There are some relations among these 2N matched filters. First, all the matched filters in the first set have the same input signals, while all the matched filters in the second set have the same input signals. Second, in many systems, the spreading signals $S_1$ to $S_N$ are orthogonal, such as Walsh codes. Third, for each matched filter in the first set having a particular reference signal, there is a matched filter in the second set having the same reference signal. A lot of hardware could be saved if one build all these matched filters jointly instead of treating them as totally independent filters.

FIG. 9 shows a receiver with a set of dynamic matched filter banks in a multi-channel direct sequence spread spectrum communication system. The reference signal consists of the spreading signals and the scrambled signal as in FIG. 6 and the dynamic matched filter bank is the similar to the one in FIG. 3.

There are several assumptions. First, the local reference signals are the exclusive-or of a PN sequence with each of spreading sequences. Second, the multipath fading spans over less than L symbol periods. Third, the M output signals either from signal register or from block shift PN generator correspond to a symbol period. Fourth, each spreading sequence has only one section, which corresponds to a symbol period and does not change with the time. Fifth, the section of a PN sequence in any symbol period is different from any other the section in adjacent L symbol periods. Sixth, there are N channels with corresponding spreading sequences $S_1$ to $S_N$.

For easy to describe, let L=2.

Essentially the system in FIG. 9 is the same as the system in FIG. 8. The difference is due to the change of operation order.

Also there are two set of devices. Together with signal combiner and controller, the first set of device is trying to detect and track the multipath signals falling into the first symbol period and the second is trying to detect and track the multipath signals falling into the second symbol period. The first set consists of a block shift PN generator 910, N exclusive-or array $920_1^{(1)}$ to $920_N^{(1)}$, N binary-to-value mapping device $930_1^{(1)}$ to $930_N^{(1)}$, the first matched filter bank consisting of N matched filters $935_1^{(1)}$ to $935_N^{(1)}$. The second set consists of a register array 915, N exclusive-or array $920_1^{(2)}$ to $920_N^{(2)}$, N binary-to-value mapping device $930_1^{(2)}$ to $930_N^{(2)}$, and the second matched filter bank consisting of N matched filters $935_1^{(2)}$ to $935_N^{(2)}$. In each set, there are N subsets with each subset consisting of an exclusive-or array, a binary-to-value mapping device, and a matched filter. Each subset works exactly in the same way.

The input signal, $S_{in}$, is shifted into signal register 905. There are M output signals from signal register 905, with each signal being a replica of input signal $S_{in}$ with different delay.

The block shift PN generator 910 is just like a regular PN generator except the feedback logic is based on shifting M chips at the end of every M chip clock cycles instead of shifting 1 chip at end of every chip clock cycle.

The register array 915, coupled to block shift PN generator 910, has M memory units to store M chips. It also delays its input by one symbol period or M chips.

Let's look at the subset containing the matched filter $935_1^{(1)}$.

The block of M chips generated by block shift PN generator 910 is fed into a exclusive-or array $920_1^{(1)}$, where each of M chips is exclusive-or with a corresponding chip of the spreading signal $S_1$ respectively by one of the exclusive-or gate $925_1$ to $925_M$. These M chips are converted into M values by a binary-to-value mapping device $930_1^{(1)}$. One way of mapping is to map binary 0 to value 1.0 and binary 1 to value −1.0. The M values from the output binary-to-value mapping device $930_1^{(1)}$ is sent to matched filter $935_1^{(1)}$ as its reference signal.

Matched filter $935_1^{(1)}$ consists of M multipliers and an adder. Each of the M values is multiplied by a corresponding signal from signal register 905 respectively at one of the multipliers. The products from these multipliers will be added together by the adder.

For each channel, there is a signal combiner. Each signal combiner takes two inputs, one from a corresponding matched filter in the first set and one from a corresponding matched filter in the second set. For example, for channel one, the signal combiner $950_1$ takes two inputs, one from the matched filter $935_1^{(1)}$ of the first set and another from the matched filter $935_1^{(2)}$ of the second set. The signal combiner $950_1$ will combine the two inputs together.

All the outputs from various matched filters $935_1^{(1)}$ to $935_N^{(1)}$ and from $935_1^{(2)}$ to $935_N^{(2)}$ as well as from signal combiners $950_1$ to $950_N$ will sent to controller 955. The controller 955 will extract information, find and update multipath information, and generate various controlling signals.

There are also some relations among these 2N matched filters. A lot of hardware could be saved if one build all these matched filters jointly instead of treating them as totally independent filters.

Following the example set up in FIG. 4, one skilled in the art can easily build two modified receivers with each one similar to the one on FIG. 8 and FIG. 9 respectively by letting each matched filter holding its reference signal for L symbol periods before updating. Each modified receiver will have N matched filter banks with each matched filter bank having L matched filters. Instead of holding its reference symbol for one symbol period, catching up all multipath components of a multi-channel symbol projected on a particular channel in one symbol period and then updating its reference signal to catch up all multipath components of a next multi-channel symbol projected on that particular channel in another symbol period as a matched filter in FIG. 8 or FIG. 9 does, each matched filter in a modified receiver will hold its reference signal for L continuous symbol periods before updating for catching up all multipath components of a multi-channel symbol spanned in a continuous L symbol periods and projected on a sub-channel. One skilled in the art can further share hardware by taking advantage of the fact that the set of the matched filters corresponding to catch up all the multipath components of a multi-channel symbol spanned over L symbol periods uses a same section of the PN sequence and the fact the set of the matched filters corresponding to catch up all the multipath components of different multi-channel symbols projected on a same sub-channel uses a same spreading signal.

What is claimed is:

1. A system for detecting, tracking and combining a multipath fading signal, wherein said multipath fading signal has a plurality of significant "multipath components spanned over a plurality of symbol periods, said system comprising:

a signal register consisting of a plurality of shift registers, coupled to receive said multipath fading signal for capturing a moving section of said multipath fading signal and for providing a plurality of tapped output signals with each tapped output signal taken from a corresponding shift register of said plurality of shift registers, wherein said plurality of shift registers are driven by a sampling clock;

a reference signal generator for producing a plurality of sections of a local reference signal with each section corresponding to one symbol period and held for one symbol period before being updated and with any two adjacent sections of said local reference signal being offset by one symbol period in phase and being different;

a plurality of correlation devices for generating a plurality of correlation signals with each correlation device coupled to receive said plurality of tapped output signals simultaneously and a corresponding section of said plurality of sections of said local reference signal simultaneously for generating a corresponding correlation signal indicating a plurality of similarities between said multipath fading signal and said corresponding section of said plurality of sections of said local reference signal over a symbol period at a plurality of moments determined by said sampling clock;

a signal combiner coupled to receive said plurality of correlation signals for combining said plurality of correlation signals to produce a combined signal according to a multipath profile, wherein said signal combiner combines three or more said correlated signals; wherein said signal combiners is under the control of a control device and said control device coupled to receive said plurality of correlation signals and said combined signal from out of said signal combiner for identifying and updating said multipath profile and generating a control signal to align up said plurality of correlation signals to produce said combined signal.

2. The system for detecting, tracking and combining a multipath fading signal as in claim 1, wherein said reference signal generator comprises a plurality of devices selected from a group consisting of a first set of devices, a second set of devices, a third set of devices, and a fourth set of devices:

said first set of devices comprising a plurality of block reference signal generators for generating said plurality of sections of said local reference signal with each block reference generator generating a section of said local reference signal corresponding to one symbol period and holding said section of said local reference signal for one symbol period before updating and with a section of said plurality of sections of said local reference signal being offset from any other section of said plurality of sections of said local reference signal by one to multiple symbol periods;

said second set of devices comprising a block reference signal generator for generating a section of said local reference signal corresponding to one symbol period and holding said section of said local reference signal for one symbol period before updating and a plurality of cascaded register arrays for generating a plurality of delayed versions of said section of said local reference signal with each register array comprising a plurality of memory elements operating at a symbol rate clock, with a register array of said plurality of cascaded coupled to receive said section of said local reference signal, and with each of rest of said plurality of cascaded register arrays coupled to receive a plurality of outputs from a plurality of memory elements of its previous register array, whereby said section of said local reference signal and said plurality of delayed versions of said section of said local reference signal construct said plurality of sections of said local reference signal;

said third set of devices comprising a block reference signal generator for generating a section of said local reference signal corresponding to one symbol period and holding said section of said local reference signal for one symbol period before updating and a plurality of circuits for generating a plurality of delayed versions of said section of said local reference signal, with each circuit coupled to receive said section of said local reference signal to delay said section of said local reference signal by one to multiple symbol periods and with a different circuit delaying by a different amount of time, whereby said section of said local reference signal and said plurality of delayed versions of said section of said local reference signal construct said plurality of sections of said local reference signal; and said fourth set of devices comprising a block reference signal generator and a plurality of register arrays coupled to said block reference signal generator, wherein said block reference signal generator produces a section of said local reference signal by a time with adjacent sections being offset by one symbol period, wherein each register array catches up a corresponding section from said block reference signal generator and holds for one symbol period before updating, and whereby said plurality of register arrays produce said plurality of sections of said local reference signal with a section from a corresponding register array.

3. The system for detecting, tracking and combining a multipath fading signal as in claim 2, wherein each block reference signal generator comprises a linear feedback shift register with a feedback logic to shift a plurality of chips at one time.

4. The system for detecting, tracking and combining a multipath fading signal as in claim 1, said system further comprising a second local reference signal generator for producing a section of a second local reference signal, wherein each of said plurality of correlation devices comprises a multiplier array and a matched filter with said multiplier array, coupled to receive said plurality of tapped output signals and a section of said plurality of sections of said local reference signal, for multiplying each tapped output signal by a corresponding signal selected from said section of said plurality of sections of said local reference signal to produce a modified signal and with said matched filter, coupled to receive said modified signal and said section of said second local reference signal, for generating a correlation signal of said plurality of correlation signals to measure a similarity between said section of said second local reference signal and said modified signal.

5. The system for detecting, tracking and combining a multipath fading signal as in claim 4, wherein said section of said second local reference signal corresponds to one symbol period and is invariant with time.

6. The system for detecting, tracking and combining a multipath fading signal as in claim 1, wherein each of said plurality of correlation devices comprises a matched filter, said matched filter coupled to receive said plurality of tapped output signals and a section of said plurality of sections of said local reference signal for generating a correlation signal of said plurality of correlation signals to measure a similarity between said moving section of said multipath fading signal and said section of said plurality of sections of said local reference signal.

7. A system for detecting, tracking and combining a multipath fading signal, wherein said multipath fading signal has a plurality of significant multipath components spanned over a plurality of symbol periods, said system comprising:

a signal reform device consisting of a plurality of shift registers for generating a plurality of preprocessed signals, said plurality of shift registers coupled to receive said multipath fading signal for capturing a moving section of said multipath fading signal and for providing a plurality of tapped output signals with each tapped output signal taken from a corresponding shift register of said plurality of shift registers, wherein said plurality of shift registers are driven by a sampling clock;

a reference signal generator for producing a plurality of sections of a local reference signal with each section being a portion of said local reference signal corresponding to one symbol period and holding for said plurality of symbol periods before being updated wherein any two adjacent sections of said local reference signal are offset by one symbol period in phase and are different;

a plurality of correlation devices for generating a plurality of correlation signals with each correlation device coupled to receive a corresponding section of said plurality of sections of said local reference signal simultaneously and said plurality of preprocessed signals simultaneously for generating a corresponding correlation signal indicating a plurality of similarities between said multipath fading signal and said corresponding section of said plurality of sections of said local reference signal over said plurality of symbol periods at a plurality of moments determined by said sampling clock;

a plurality of signal combiners for producing a plurality of combined signals with each signal combiner coupled to receive a corresponding correlation signal for combining said plurality of significant multipath components for a symbol over said plurality of symbol periods according to a multipath profile, wherein said each signal combiner combines three or more said correlated signals; wherein said signal combiner are under the control of a control device and said control device coupled to receive said plurality of correlation signals and said combined signals from said outputs of said signal combiners for identifying and updating said multipath profile and generating a control signal for each signal combiner to align up said plurality of significant multipath components to produce a combined signal.

8. The system for detecting, tracking and combining a multipath fading signal as in claim 7, wherein said reference signal generator comprises a plurality of devices selected from a group consisting of a first set of devices, a second set of devices, and a third set of devices:

said first set of devices comprising a plurality of block reference signal generators for generating said plurality of sections of said local reference signal with each block reference generator generating a section of said local reference signal corresponding to one symbol period and holding said section of said local reference signal for said plurality of symbol periods before updating and with a section of said plurality of sections of said local reference signal being offset from any other section of said plurality of sections of said local reference signal by at least one symbol period;

said second set of devices comprising a block reference signal generator for generating a section of said local reference signal corresponding to one symbol period and holding said section of said local reference signal for said plurality of symbol periods before updating and a plurality of circuits for generating a plurality of delayed versions of said section of said local reference signal with each circuit coupled to receive said section of said local reference signal to delay said section of said local reference signal by one to multiple symbol periods and with a different circuit delaying by a different amount of time, whereby said section of said local reference signal and said plurality of delayed versions of said section of said local reference signal construct said plurality of sections of said local reference signal; and said third set of devices comprising a block reference signal generator and a plurality of register arrays coupled to said block reference signal generator, wherein said block reference signal generator produces a section of said local reference signal by a time with adjacent sections being offset by one symbol period, wherein each register array catches up a corresponding section from said block reference signal generator and holds for said plurality of symbol periods before updating, and whereby said plurality of register arrays produce said plurality of sections of said local reference signal with a section from a corresponding register array.

9. The system for detecting, tracking and combining a multipath fading signal as in claim 7, wherein said signal reform device further comprises a second local reference signal generator for producing a section of a second local reference signal and a multiplier array, said multiplier array coupled to received said section of said second local reference signal and said plurality of tapped output signals for generating said plurality of preprocessed signals by multiplying each tapped output signal with a corresponding signal selected from said section of said second local reference signal.

10. The system for detecting, tracking and combining a multipath fading signal as in claim 9, wherein said section of said second local reference signal corresponds to one symbol period and is invariant with time.

11. The system for detecting, tracking and combining a multipath fading signal as in claim 7, wherein each of said plurality of correlation devices comprises a matched filter, said matched filter coupled to receive said plurality of tapped output signals as said plurality of said preprocessed signals and a section of said plurality of sections of said local reference signal for generating a correlation signal of said plurality of correlation signals to measure a similarity between said moving section of said multipath fading signal and said section of said plurality of sections of said local reference signal over a symbol period for continuous said plurality of symbol periods.

12. A multi-channel spread spectrum communication system for detecting, tracking and combining a multipath fading signal, wherein said multipath fading signal has a plurality of significant multipath components with each of a plurality of sequentially transmitted multi-channel symbols spanned over a plurality of symbol periods, said each multi-channel symbol comprising a plurality of sub-channel symbols, said system comprising:

a signal register consisting of a plurality of shift registers, said plurality of shift registers coupled to receive said multipath fading signal for capturing a moving section of said multipath fading signal and for providing a plurality of tapped output signals with each tapped output signal taken from a corresponding shift register of said plurality of shift registers, wherein said plurality of shift registers are driven by a sampling clock;

a first component reference signal generator for producing a plurality of sections of a first local reference signal with each section being a portion of said first local reference signal and corresponding to one symbol period and with any two adjacent sections of said first local reference signal being offset by one symbol period in phase and being different;

a second component reference signal generator for generating a plurality of second component reference signals with each second component reference signal corresponding to a sub-channel;

a plurality of correlation devices for generating a plurality of correlation signals with each correlation device coupled to receive a corresponding section of said plurality of sections of said first local reference signal simultaneously and a corresponding second component reference signal simultaneously for generating a correlation signal reflecting similarity between said multipath fading signal and a combination signal synthesized from said corresponding section of said plurality of sections of said first local reference signal and said corresponding second component reference signal over a symbol period at a plurality of moments determined by said sampling clock;

a plurality of signal combiners for producing a plurality of combined signals according to a multipath profile with each signal combiner coupled to receive a plurality of correlation signals from a plurality of correlation devices coupled to receive a same second component reference signal, wherein said each signal combiner combines three or more said correlated signals; wherein said signal combiners are under the control of a control device and said control device coupled to said plurality of correlation devices and said plurality of signal combiners for identifying and updating said multipath profile and for generating a control signal for each signal combiner to align up said plurality of significant multipath components to produce a combined signal.

13. The multi-channel spread spectrum communication system for detecting, tracking and combining a multipath fading signal in claim 12, wherein said second component reference signal generator produces a plurality of mutual orthogonal codes as said plurality of second component reference signals with each orthogonal code having a code length corresponding to one symbol period.

14. The multi-channel spread spectrum communication system for detecting, tracking and combining a multipath fading signal in claim 12, wherein said first component reference signal generator comprise a plurality of devices selected from a group consisting of a first set of devices, a second set of devices, a third set of devices and a fourth set of devices:

said first set of devices comprising a plurality of block reference signal generators for generating said plurality of sections of said first local reference signal with each block reference generator generating a section of said first local reference signal corresponding to one symbol period and holding said section of said first local reference signal for one symbol period before updating and with a section of said plurality of sections of said first local reference signal being offset from any other section of said plurality of sections of said first local reference signal by at least one symbol period;

said second set of devices comprising a block reference signal generator for generating a section of said first local reference signal corresponding to one symbol period and holding said section of said first local reference signal for one symbol period before updating and a plurality of cascaded register arrays for generating a plurality of delayed versions of said section of said first local reference signal with each register array comprising a plurality of memory elements operating at a symbol rate clock, with a register array of said plurality of cascaded register arrays coupled to receive said section of said first local reference signal, and with each of rest of said plurality of cascaded register arrays coupled to receive a plurality of outputs from a plurality of memory elements of its previous register array, whereby said section of said local reference signal and said plurality of delayed versions of said section of said first local reference signal construct said plurality of sections of said local reference signal;

said third set of devices comprising a block reference signal generator for generating a section of said first local reference signal corresponding to one symbol period and holding said section of said first local reference signal for one symbol period before updating and a plurality of circuits for generating a plurality of delayed versions of said section of said first local reference signal, with each circuit coupled to receive said section of said first local reference signal to delay said section of said first local reference signal by one to multiple symbol periods and with a different circuit delaying by a different amount of time, whereby said section of said first local reference signal and said plurality of delayed versions of said section of said first local reference signal construct said plurality of sections of said first local reference signal; and said fourth set of devices comprising a block reference signal generator and a plurality of register arrays coupled to said block reference signal generator, wherein said block reference signal generator produces a section of said first local reference signal by a time with adjacent sections being offset by one symbol period, wherein each register array catches up a corresponding section from said block reference signal generator and holds for one symbol period before updating, and whereby said plurality of register arrays produce said plurality of sections of said first local reference signal with a section from a corresponding register array.

15. The multi-channel spread spectrum communication system for detecting, tracking and combining a multipath fading signal in claim 12, wherein said plurality of correlation devices, each correlation device comprises a multiplier array and a matched filter:
said multiplier array coupled to receive a section of said plurality of sections of said first local reference signal and to receive said plurality of tapped output signals, for producing a plurality of preprocessed signals by multiplying each tapped output signal by a corresponding signal selected from said section of said plurality of sections of said first local reference signal; and
said matched filter coupled to receive said plurality of preprocessed signals and to receive a second component reference signal, for producing a correlation signal between said moving section of said multipath fading signal and a combination signal synthesized from said section of said plurality of sections of said first local reference signal and said second component reference signal.

16. The multi-channel spread spectrum communication system for detecting, tracking and combining a multipath fading signal in claim 12, wherein said plurality of correlation devices, each correlation device comprises an exclusive-or array and a matched filter:
said exclusive-or array coupled to receive a section of said plurality of sections of said first local reference signal and to receive a second component reference signal, for producing a plurality of revised reference signals by exclusive-oring each bit of said section of said plurality of sections of said first local reference signal with corresponding bit of said second component reference signal; and
said matched filter coupled to receive said plurality of revised reference signals and said plurality of tapped output signals, for producing a correlation signal between said moving section of said multipath fading signal and a combination signal synthesized from said section of said plurality of sections of said first local reference signal and said second component reference signal.

17. The multi-channel spread spectrum communication system for detecting, tracking and combining a multipath fading signal in claim 12, said system further comprising a plurality of multiplier arrays with each multiplier array for producing a modified moving section of said multipath fading signal by multiplying said moving section of said multipath fading signal with a section of a second component reference signal, wherein said first component reference signal generator comprises a block reference signal generator for generating a section of said first local reference signal by a time with adjacent sections being offset by one symbol period and a plurality of register arrays with each register array coupled to said block reference signal generator for holding a section of said first local reference signal corresponding to one symbol period for a plurality of symbol periods before updating, wherein each correlation device comprises a matched filter coupled to receive a modified moving section of said multipath fading signal from a corresponding multiplier array and a section of said first local reference signal from a corresponding register array, whereby each multiplier array provides a modified moving section of said multipath fading signal to a plurality of matched filters with each matched filter deployed to detect all multipath components spanned over a plurality of symbol periods for a corresponding sub-channel symbol, and whereby each register array provides a corresponding section of said first component reference signal to a plurality of matched filters with each matched filter deployed to detect all multipath components spanned over said plurality of symbol periods for a sub-channel symbol belonging to a same multi-channel symbol.

18. The multi-channel spread spectrum communication system for detecting, tracking and combining a multipath fading signal in claim 12, wherein said first component reference signal generator comprises a block reference signal generator for generating a section of said first local reference signal by a time with adjacent sections being offset by one symbol period, said system further comprising a plurality of exclusive-or arrays with each exclusive-or array coupled to receive a signal from said block reference signal generator and to receive a corresponding second component reference signal from said second component reference signal generator for producing a combination signal by exclusive-oring a section of said first local reference signal with a section of said corresponding second component reference signal and a plurality of register arrays with each register array coupled to a corresponding exclusive-or array to receive a combination signal and to hold said combination signal for said plurality of symbol periods before updating, wherein each correlation device comprises a matched filter receiving said moving section of said multipath fading signal from said signal register and a combination signal from a corresponding register array, whereby each exclusive-or array provides the combination signal to a plurality of matched filters with each matched filter deployed to detect all multipath components spanned over said plurality of symbol periods for a corresponding sub-channel symbol.

19. The multi-channel spread spectrum communication system for detecting, tracking and combining a multipath fading signal in claim 12, said plurality of significant multipath components spanned over L symbol periods, said second component reference signal generator having N second component reference signals, said system comprising LN correlation devices.

20. The multi-channel spread spectrum communication system for detecting, tracking and combining a multipath fading signal in claim 12, wherein second local reference signal corresponds to one symbol period and is invariant with time.

* * * * *